April 22, 1952  F. W. STEIN  2,593,807
APPARATUS FOR TESTING MATERIALS
Filed Feb. 28, 1951  2 SHEETS—SHEET 1

INVENTOR.
Frederick W. Stein
BY
ATTORNEY

INVENTOR.
Frederick W. Stein
BY
Thos. E. Scofield
ATTORNEY.

Patented Apr. 22, 1952

2,593,807

UNITED STATES PATENT OFFICE 2,593,807

APPARATUS FOR TESTING MATERIALS

Frederick W. Stein, Atchison, Kans.

Application February 28, 1951, Serial No. 213,157

23 Claims. (Cl. 175—183)

1

The present invention relates to an apparatus for testing materials and more particularly to a device for determining the relative proportions of two known constituents intimately mixed together, or, as another example, the moisture content of a substance; and is an improvement of the apparatus disclosed in the prior patent to Stein 2,440,386 issued April 27, 1948.

As disclosed in the prior patent referred to above, the percentage composition of an emulsion or mixture may be readily determined by such electrical characteristics of the mixture as its dielectric value and its capacitive and resistive impedance to the passage of high frequency electric current. In order to easily determine the dielectric value of a substance to be analyzed; for example, to indicate the moisture content of a sample of sweet corn, a receptacle having a pair of spaced electrodes insulated from each other may be provided in which the sample is placed. The electrodes may be connected as a condenser in the tuning circuit of a suitable high frequency vacuum tube oscillator circuit in a manner whereby the change in capacitance of the condenser will cause a change in frequency of the oscillator circuit which may be readily indicated by conventional frequency discriminating circuits to thereby indicate the dielectric value of the sample in the condenser and thus in the case of a sample of sweet corn, its moisture content. Since the measuring instrument or cell is essentially a variable capacitor in the sensitive tuned circuit portion of a vacuum tube oscillator circuit, the facility with which the instrument may be used and its accuracy are directly dependent on how carefully the instrument is shielded from extraneous capacitance effects such as the instrument operator's hand or body capacitance, microphonic effects due to poor electrical connections, contact pressures, etc.

It is therefore a principal object of my invention to provide an improved capacitance cell apparatus having shielding means to minimize extraneous capacitance effects.

Another important object of my invention is to provide an improved capacitance cell having novel means to assure positive electrical connections of uniform contact pressure which may be readily disconnected when disassembling the cell for cleaning between tests.

Another object of the invention is to provide an improved capacitance cell which may be easily disassembled for cleaning between testing of materials and in which both of the capacitor electrodes may be quickly removed from the instrument support and housing for cleaning or inspection.

In order to obtain accurate calibration of the capacitance cell in use, it is necessary to know the temperature of the substance at the time of the test. It is therefore another object of my

2 invention to provide an improved capacitance cell having electrical temperature sensing means for indicating the temperature of the sample at the time of the test.

Other objects and advantages of my invention will be apparent with reference to the following specification and drawings in which:

Fig. 2 is a vertical section taken on the line 2—2 of Fig. 1a;

Fig. 3 is a horizontal section taken on the line 3—3 of Fig. 1a;

Figure 1A:
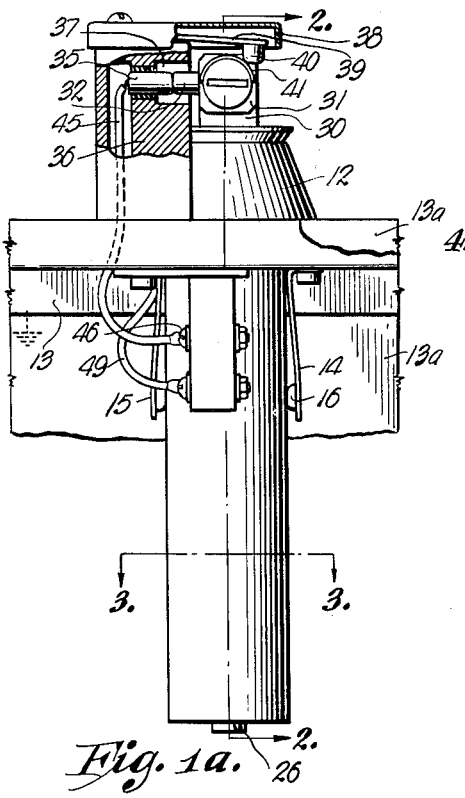
Fig. 1a is an enlarged fragmentary elevational view, partly in section, of one improved form of capacitance cell according to my invention, the housing having been largely broken away for purposes of illustration.

Referring first to Figs. 1 through 4 of the drawings for a description of one improved form of capacitance cell according to my invention, the inner and outer concentric tubular elements 10 and 11 of suitable electrical conducting material or metal constitute the test electrodes between which the sample to be tested is placed. The outer cup or tubular electrode 11 is slidably received in the collar 12 of conducting material which is integrally secured and electrically grounded to the grounded metal top plate 13 of a metallic instrument enclosing casing 13a. In order to assure positive electrical grounding of the outer tubular electrode 11 and thus minimize microphonic difficulties due to variations of contact pressure, a plurality of spring pressed grounding contacts 14 and 15 are secured to the underside of the grounded top plate 13 in a manner to positively engage with a constant spring pressure, the outer metallic wall of the electrode 11 with suitable electrical contact and wiping surfaces 16 of silver or the like.

The core or inner electrode 19 is adapted to be removably secured in precise concentric relation within the outer electrode 11 by means of upper and lower insulating spacer members 20 and 21, respectively. Each of the spacer members 20 and 21 are provided with cut-out portions such as shown at 22 on Fig. 3 to permit the passage into the cell of material under test. The inner electrode 10 is longitudinally positioned within the electrode 11 when the bottom spacer member 21 is supported on the transverse metal wall 23 beneath which is positioned an electrical temperature sensitive variable resistance device 24. The temperature sensitive resistance 24 is connected at one end by a compression spring 25 to the insulated electrical connection post 26 and at the other end to the grounded metal wall 23. The post 26 and the grounded casing of the instrument may be connected to any suitable indicating circuit such as a Wheatstone bridge circuit to thus indicate the temperature of the substance within the cell and in contact with the upper surface of the transverse metal plate 23 at the time of the test.

Figure 2:
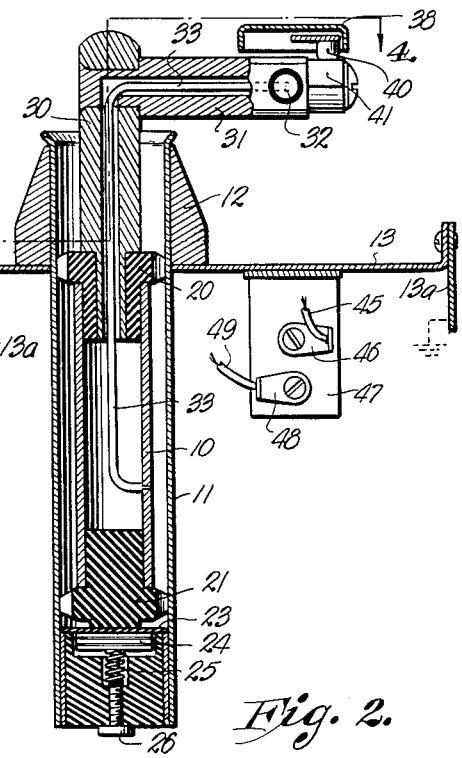
Figure 3:
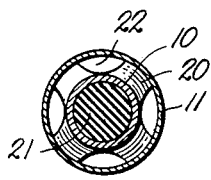

The upper insulating spacer member 20 is provided with a central bore in which is secured a longitudinally drilled metal post 30. At the upper end of the post 30, a longitudinally drilled metallic latching arm 31 is laterally extending. On the outer end of the latching arm, a cylindrical electric contact button 32 is secured in insulated relation, as shown in Figs. 1a and 2. An insulated electric wire 33 passes through the drilled portions of the metallic post 30 and metallic latching arm 31 to electrically connect the inner electrode 10 with the insulated contact 32.

Figure 4:
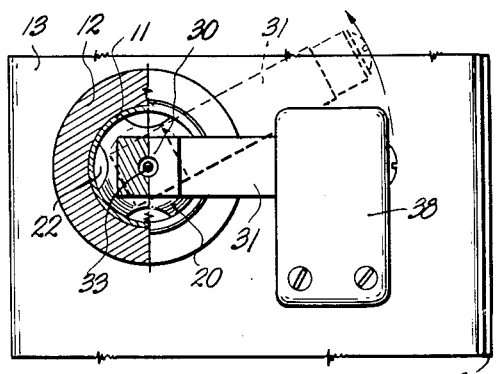
Fig. 4 is a horizontal section taken on the line 4—4 of Fig. 2.
Figure 1:
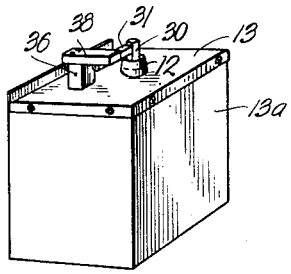
Fig. 1 is a perspective view of my test unit.
Figure 5:
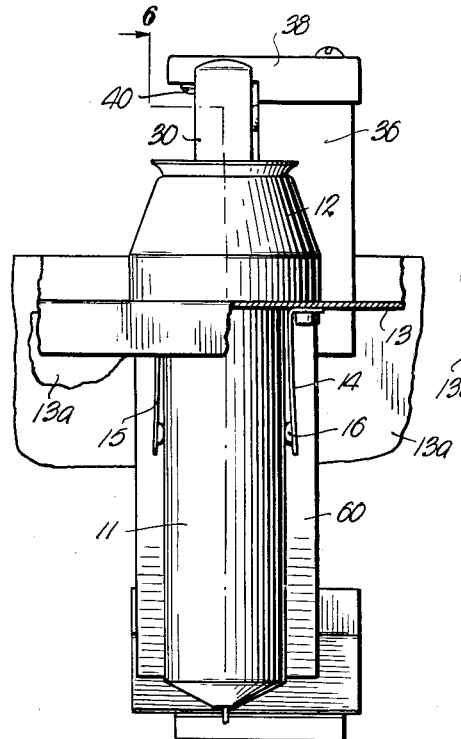
Fig. 5 is a fragmentary elevational view of a modified form of improved capacitance cell according to my invention.

When the instrument parts and the latching arm 31 are in the operative position shown in Fig. 1a and by the solid lines of Fig. 4, the contact 32 is adapted to engage a similar electric contact 35 supported in insulated relation on the metal keeper post member 36 that is integrally secured and electrically grounded to the grounded plate 13. It will be noted that the contact 35 extends within an enlarged opening 37 of the metallic keeper post member 36 in which is also received the contact member 32 in the operative position of the instrument so as to provide complete electrical shielding of the contacts 32 and 35. Secured to the top of the grounded post 36 and beneath the metallic cover 38 is a grounding spring 39, adapted to connect at 40 with a commutator surface 41 of the latching arm 31 to electrically ground the arm 31 and post 30 thus shielding the wire 33 from extraneous capacitance effects.

The fixed metal post 36 is drilled as shown in Fig. 1a to pass the insulated wire 45 connecting the electric contact 35 to the terminal 46 of the terminal board 47 contained within the grounded metal instrument casing 13a. The other terminal 48 is connected by wire 49 to the grounding spring 15 for the outer electrode 11 and both terminals 46 and 48 may be connected to a suitable high frequency vacuum tube oscillating circuit as is well known in the art.

It should be noted that the contact surface 40 of the grounding spring 39 engages the commutator surface 41 of the latching arm 31 in an over-center relation in the operative position to thus force the contacts 32 and 35 into positive and uniform electrical contact with each other, thus minimizing microphonic disturbances due to variations of contact pressure. When the arm 31 is moved to the dotted line position shown in Fig. 4, the core or inner electrode 10 and its assembly of insulating spacers 20, 21 and metallic post and latching arm 30, 31 may be lifted out of the cup or tubular electrode 11 for cleaning. Also, the tubular electrode 11 which is slidably received in the bushing 12 may be lifted out of the instrument casing for cleaning or other purposes. When the instrument parts are in the operative position shown in Figs. 1, 1a and 2 of the drawings, the electric wires 33 and 45 and the electrical connections 32, 35 and 46 are completely enclosed in electrically grounded or shielded housings thus excluding extraneous capacitance effects on the connections of the ungrounded inner electrode 10 which itself is shielded within the grounded electrode 11.

Figure 6:
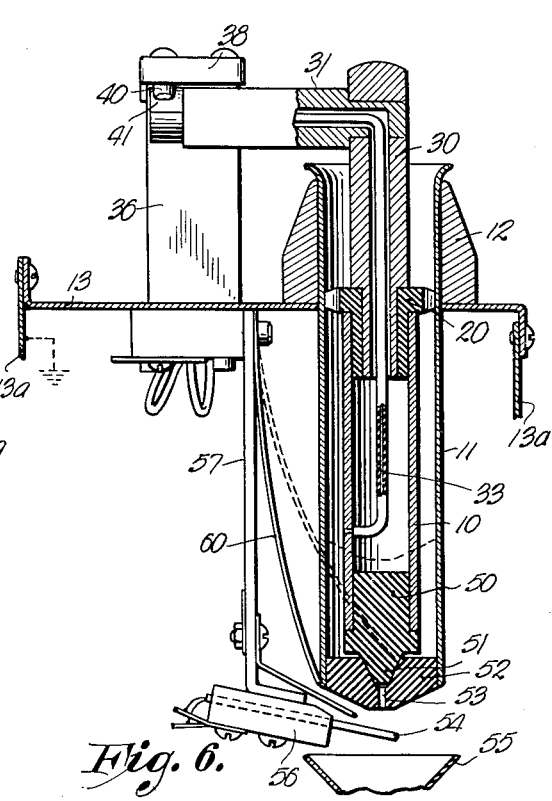
Fig. 6 is a vertical section on the line 6—6 of Fig. 5.
Figure 8:
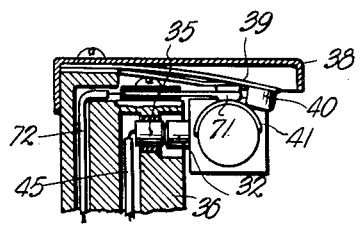
Fig. 8 is a fragmentary detailed vertical section of the electrical connections partly shown in Fig. 7.
Figure 7:
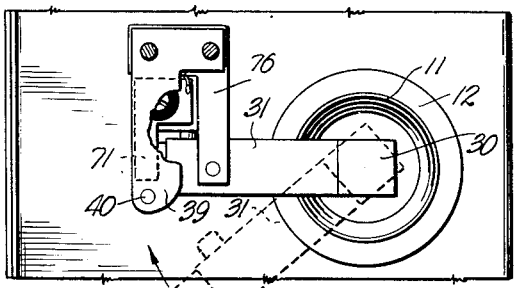
Fig. 7 is a fragmentary top plan, partly broken away, of the instrument shown in Figs. 5 and 6.

Referring now to Figs. 5 through 9 of the drawings, a modified form of the improved capacitance cell of my invention will be described and parts which are similar to those described in connection with Figs. 1 through 4 of the drawings will be given the same reference numerals and will not be further described in detail. As shown in Fig. 6, the lower insulating spacer member 50 which corresponds to the lower spacer 21 of Fig. 2, is provided with a conical end 51 adapted to seat within a similarly shaped aperture of the end plug 52 so that when the parts are in the position shown, liquid material under test is retained in the space between the electrodes 10 and 11, and the concentric alignment of the electrodes is maintained. However, when the latching arm 31 is rotated to the dotted line position shown in Fig. 7 of the drawings and the core or inner electrode assembly 10 is lifted slightly from within the electrode 11, the liquid or emulsion under test drains through the drain outlet 53 in the end plug 52 and over the electrical temperature sensitive resistance 54 into the funnel 55 through the instrument casing and into a suitable receiving container (not shown). The temperature sensitive element 54 is insulatably supported at 56 on a suitable bracket 57 depending from the grounded top plate 13 within the metallic instrument casing 13a.

When it is desired to entirely remove the cup or outer electrode 11, a flat spring plate 60 moves to the dotted line position of Fig. 6 to shield the temperature sensitive element 54 from any foreign matter falling from above through the collar 12.

Figure 9:
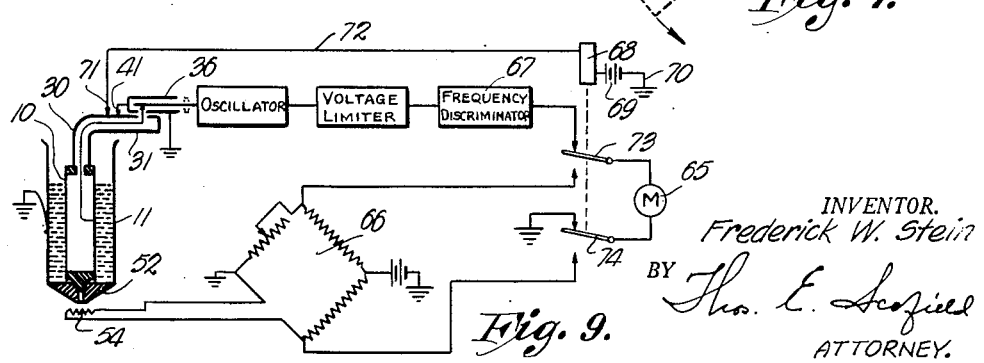
Fig. 9 is a diagrammatic illustration of the capacitance cell shown in Figs. 5 through 8, together with an electrical circuit for indicating either the electrical capacitance of the cell or the temperature of sample under test depending upon the manipulation of the cell.

In the form of the invention now being described in connection with Figs. 5 through 9 of the drawings and with particular reference to Fig. 9 contact means together with a circuit relay are provided to automatically connect an indicating meter 65 to either a temperature responsive Wheatstone bridge circuit 66 or to a frequency discriminating circuit 67 of the capacitance cell and indicating circuits depending upon the position of the latching arm 31. As shown particularly in Figs. 7, 8, and 9 of the drawings, the relay 68 is energized through battery 69, ground connection 70, grounded commutator segment 41, insulated contact spring 71, and insulated wire 72, when the latching arm is in the latched or operative position. During the time that relay 68 is energized, its switch contacts 73 and 74 connect the meter 65 to the rectified output of the frequency discriminator circuit 67 to thus indicate the frequency of the vacuum tube oscillator and therefore the capacitance of the cell including the dielectric value of the liquid or emulsion under test within the cell. When the cross arm 31 is moved to the dotted line position of Fig. 7, the relay 68 is de-energized and the meter 65 is thereby connected through switch contacts 73 and 74 to the resistance bridge circuit 66 to indicate the temperature of the liquid draining onto the temperature sensitive resistance element 54 as the inner electrode 10 is raised.

As an additional precaution against inductive voltage kicks and consequent damage to the meter 65 when the latching arm 31 is first moved to or from the operative position, a secondary grounding spring contact 76 may be provided to assure a positive grounding of the latching arm during the sequence of engagements of contacts 32, 35, 40 and 71 until a period of time after which the contact 71 is disengaged to de-energize the relay 68 and connect the meter 65 to the temperature bridge.

Having thus described my invention, I claim:

1. In a cell for determining the electrical characteristics of materials, an outer tube of conducting material grounded to and suspended from a grounded support of conducting material, an inner tube of conducting material concentrically positioned within the outer tube, upper and lower insulating members adapted to hold the tubes in spaced apart relation, a first post of conducting material secured to and extending from said upper insulating disk in alignment with and insulated from said inner tube, a latching arm of conducting material secured laterally to the free end of said first post, a stationary keeper post of conducting material grounded and secured to said grounded support, a first electrical contact mounted on said latching arm and insulated therefrom, a second electrical contact mounted on said keeper and insulated therefrom, said first and second electrical contacts being engaged when said latching arm engages said keeper post, a grounding spring on said keeper post and adapted to engage the conducting surface of said latching arm when said latching arm engages said keeper post, said first post and said latching arm being drilled to enclose an insulated wire electrically connecting said inner tube with said first insulated contact, and said keeper post being drilled to enclose an insulated wire electrically connecting said second insulated contact with a terminal strip.

2. In a cell for determining the electrical characterics of materials, a grounded support of conducting material, an aperture in said support, a collar of conducting material grounded and secured to said support to surround said aperture, an outer tube of conducting material slidably supported vertically within said collar, means to ground said outer tube to said support, an inner tube of conducting material concentrically positioned within the outer tube, upper and lower insulating members adapted to hold the tubes in spaced apart relation, a first post of conducting material secured to and extending from said upper insulating disk in alignment with and insulated from said inner tube, a latching arm of conducting material secured laterally to the free end of said first post, a stationary keeper post of conducting material grounded and secured to said grounded support, a first electrical contact mounted on said latching arm and insulated therefrom, a second electrical contact mounted on said keeper and insulated therefrom, said first and second electrical contacts being engaged when said latching arm engages said keeper post, a grounding spring on said keeper post and adapted to engage the conducting surface of said latching arm when said latching arm engages said keeper post, said first post and said latching arm being drilled to enclose an insulated wire electrically connecting said inner tube with said first insulated contact, and said keeper post being drilled to enclose an insulated wire electrically connecting said second insulated contact with a terminal strip.

3. A cell as in claim 1 wherein said grounding spring is provided with an electrical contact surface adapted to engage the conducting surface of said latching arm in over center relation whereby to urge said first and second insulated electrical contacts together with uniform contact pressure when said latching arm engages said keeper.

4. A cell as in claim 2 wherein said means to ground said outer tube is comprised of a plurality of spring grounding fingers secured to said grounded support and engaging the outer conducting surface of said outer tube with uniform contact pressure.

5. A cell as in claim 1 wherein said second electrical contact is enclosed within a recess of said keeper, said recess being adapted to surround in insulated relation the first electrical contact when said first and second electrical contacts are in engagement with each other.

6. A cell as in claim 1 wherein said outer tube is provided with a plug of insulating material at its lower end, a disk of conducting material overlying said plug and electrically connected to said outer tube, and a temperature sensitive resistor embedded in said plug, one end of said resistor being connected to said disk and the other end being connected to a terminal post carried by said plug.

7. A cell as in claim 1 wherein said outer tube is provided with a plug of insulating material at its lower end, said plug having a conical depression on its upper surface connecting with a drain hole extending therethrough axially of the outer tube, the lower insulating member for said inner and outer tubes being shaped to plug said depression and drain hole when said inner and outer tubes are in the longitudinal alignment of the operative position of the cell.

8. A cell as in claim 7 with a temperature sensitive resistor supported beneath said drain hole whereby the contents of said cell are drained thereover when the inner tube is lifted within the outer tube.

9. A cell as in claim 2 wherein said outer tube is provided with a plug of insulating material at its lower end, said plug having a conical depression on its upper surface connecting with a drain hole extending axially of the outer tube, the lower insulating member for said inner and outer tubes being shaped to plug said depression and drain hole when said inner and outer tubes are in the longitudinal alignment of the operative position of the cell.

10. A cell as in claim 9 with a temperature sensitive resistor supported beneath said drain hole whereby the contents of said cell are drained thereover when the inner tube is lifted within the outer tube.

11. A cell as in claim 10 with a flat spring member secured to the grounded support and yieldingly engaging the outer surface of said outer tube to be moved to overlie said temperature sensitive resistor as said outer tube is moved upward within the collar of said grounded support.

12. In a cell for determining the electrical characteristics of materials, a support, an outer tube of conducting material carried by said support, an inner tube of conducting material, means to support said inner tube within said outer tube in vertical insulated operative relation, a horizontally swinging latching arm for securing said tubes in the operative relation, an electrical temperature sensing member associated with said cell and adapted to sense the temperature of the material under test, a keeper post carried by said support and adapted to engage said latching arm, electrical indicating means, said inner and outer tubes constituting a pair of electrodes for connection with said electrical indicating means, and relay switch means associated with said keeper post for connecting said electrodes to said indicating means when said latching arm engages said keeper and for connecting said temperature sensing member to said indicating means when said latching arm disengages with said keeper.

13. In a cell for determining the electrical characteristics of materials, a stationary support, a vertically elongated electrically grounded cup mounted on said support, a vertically elongated ungrounded electrode within said cup and supported thereby for rotation about a vertical axis, the upper end of said electrode being below the level of the open upper end of the cup, a rigid shield of conducting material secured to said electrode to turn therewith, means electrically insulating said shield from said electrode, said shield comprising a hollow post extending upwardly from said electrode and having at a point above said cup an integral hollow arm member projecting laterally over the rim of the cup whereby said arm member is adapted to swing in a generally horizontal arc as said electrode turns, a stationary hollow post member on said support in the path of the free end of said arm member, said last post member being electrically grounded, one of said members containing a socket with an electrical contact recessed therein, said contact being supported by said one member but insulated therefrom and being connected to an insulated conductor within the hollow interior of said one member, the other of said members carrying an insulated contact adapted to enter said socket and engage said first contact when said arm is swung toward said post, an insulated conductor in the hollow interior of said other member, the one of said conductors in said arm member extending through same and through said first post and being connected at its other end to said electrode, and a stationary grounded contact positioned to be engaged by said arm member upon swinging of same to bring said first two contacts into engagement.

14. Apparatus for testing materials, comprising an annular chamber closed at its lower end and open at its upper end for receiving a sample of the material to be tested, the inner and outer walls of said chamber comprising spaced apart electrodes for engaging the sample, means for grounding the outer electrode, the upper extremity of the inner electrode being below the level of the upper edge of the outer electrode whereby said inner electrode is electrically shielded by said outer electrode, a post of conducting material supported on but insulated from said inner electrode, said post extending upwardly from the inner electrode, an arm member projecting laterally from the upper portion of said post over the upper edge of said outer electrode and adapted to swing in a substantially horizontal arc about the vertical axis of said post, a stationary stop member disposed in the path of the free end of said arm member, one of said members containing a socket with an electrical contact recessed therein, said contact being supported by said one member but insulated therefrom, the other of said members carrying an insulated contact adapted to enter said socket and engage said first contact when said arm member is swung toward said post member, each of said members being hollow, an insulated electrical conductor in the hollow interior of each member permanently connected to the one of said contacts carried by that member, the conductor in said arm member extending through same and through said post and being connected at its other end to said electrode, and means for grounding said stop member said arm member and said post to shield said conductors.

15. Apparatus for testing materials, comprising an annular chamber closed at its lower end and open at its upper end for receiving a sample of the material to be tested, the inner and outer walls of said chamber comprising spaced apart electrodes for engaging the sample, means for grounding the outer electrode, the upper extremity of the inner electrode being below the level of the upper edge of the outer electrode whereby said inner electrode is electrically shielded by said outer electrode, a post of conducting material supported on but insulated from said inner electrode, said post extending upwardly from the inner electrode, an arm member projecting laterally from the upper portion of said post over the upper edge of said outer electrode and adapted to swing in a substantially horizontal arc about the vertical axis of said post, a stationary stop member disposed in the path of the free end of said arm member, one of said members containing a socket with an electrical contact recessed therein, said contact being supported by said one member but insulated therefrom, the other of said members carrying an insulated contact adapted to enter said socket and engage said first contact when said arm member is swung toward said post member, each of said members being hollow, an insulated electrical conductor in the hollow interior of each member permanently connected to the one of said contacts carried by that member, the conductor in said arm member extending through same and through said post and being connected at its other end to said electrode, means for permanently grounding one of said members, and a grounded contact carried by said last member adapted to engage the other member to ground same whenever said first and second contacts are in engagement.

16. Apparatus of the character described comprising a support, a metal arm member pivoted on said support to swing about an axis transverse to the length of the arm member, a stationary electrically grounded stop member spaced laterally from said axis and disposed in the path of said arm member, the leading side of said arm member as same is swung toward said stop member including a facial portion adapted to directly confront a corresponding facial portion of said stop member when the arm member reaches the limit of such movement permitted by said stop member, one of said members containing a socket extending inwardly from said facial portion thereof, an electrical contact recessed in said socket and supported by said one member but insulated therefrom, a cooperating insulated electrical contact carried by the other member on said facial portion thereof in a position to enter said socket and engage said first contact upon swinging of said arm member toward said stop member, each of said members being hollow, an insulated electrical conductor in the hollow interior of each member permanently connected to the one of said contacts carried by that member, and a grounded contact on said stop member in a position to be engaged by said arm member whenever said first and second contacts are brought into engagement upon swinging of said arm member toward said stop member.

17. Apparatus as in claim 16 wherein said grounded contact comprises a spring adapted to engage said arm member in over-center relation thereto, thereby to urge said first and second contacts together with uniform contact pressure.

18. Apparatus as in claim 16 wherein said stop member has a keeper spring adapted to engage said arm member in over-center relation thereto, thereby to yieldably urge said first and second contacts together upon engagement of same.

19. Apparatus for testing materials comprising a stationary vertically elongated cup having a drain aperture in the bottom thereof, a vertically elongated core member insertable in the open upper end of the cup and slidable downwardly therein, closure means on the lower end of said core member adapted to seal said aperture when same is advanced downwardly to a predetermined position, said core member constructed and arranged to form with said cup an annular chamber for receiving a sample of the material to be tested, the inner and outer walls of said chamber comprising electrodes for engaging the sample, and a temperature sensing element below said aperture whereby the material draining from said cup through said aperture upon lifting of said core from said predetermined position flows over said element.

20. Apparatus for testing materials comprising a stationary collar the axis of whose central opening is substantially vertical, a stationary temperature sensing element spaced below said collar in vertical alignment with said opening, a laterally displaceable shield normally positioned intermediate said opening and said element to prevent foreign matter from descending through the opening onto the element, an upright tubular test cell slidable vertically downward through said collar, said cell having means to engage said shield and displace same laterally upon such movement, stop means to halt the downward movement of said cell when the bottom thereof reaches a position spaced slightly above said element, a drain aperture in the bottom of the cell in vertical alignment with said element, a vertically elongated core member insertable in the open upper end of the cell and slidable downwardly therein, closure means on the lower end of said core member adapted to seal said aperture when same is advanced downwardly to a predetermined position, said core member constructed and arranged to form with said cup an annular chamber for receiving a sample of the material to be tested, the inner and outer walls of said chamber comprising electrodes for engaging the sample.

21. Apparatus for testing materials comprising a stationary collar the axis of whose central opening is substantially vertical, a stationary temperature sensing element spaced below said collar in vertical alignment with said opening, a laterally displaceable shield normally positioned intermediate said opening and said element to prevent foreign matter from descending through the opening onto the element, an upright tubular test cell slidable vertically downward through said collar, said cell having means to engage said shield and displace same laterally upon such movement, stop means to halt the downward movement of the cell when the bottom thereof reaches a position spaced slightly above said element, and a drain aperture in the bottom of the cell in vertical alignment with said element.

22. Apparatus for testing materials comprising a stationary collar the axis of whose central opening is substantially vertical, a stationary temperature sensing element spaced below said collar in vertical alignment with said opening, a bowed spring band anchored at one end with its free end positioned intermediate said opening and said element to prevent foreign matter from descending through said opening onto the said element, an upright tubular test cell slidable vertically downward through said collar, the lower end of said cell adapted to engage said spring band and deflect same laterally on such movement, stop means to halt the downward movement of said cell when the bottom thereof reaches a position spaced slightly above said element, and a drain aperture in the bottom of the cell disposed in vertical alignment with said element.

23. Apparatus for testing materials comprising a stationary vertically elongated cup having a drain aperture in the bottom thereof, a vertically elongated core member insertable in the open upper end of the cup and slidable downwardly therein, closure means on the lower end of said core member adapted to seal the aperture when same is advanced downwardly to a predetermined position, a keeper engageable with said core member to hold same in said predetermined position, said core member constructed and arranged to form with the cup an annular chamber for receiving a sample of the material to be tested, the inner and outer walls of said chamber comprising electrodes for engaging the sample, said core disengageable from said keeper to permit lifting of same from said predetermined position, a relay controlled conjointly by said keeper and said core and operating differently depending upon whether the two are engaged or disengaged, an electrical temperature sensing element below said aperture whereby the material draining from said cup through said aperture upon lifting of said core member from said predetermined position flows over said element, a first circuit including said electrodes, a second circuit including said temperature sensing element, a meter, and contact means controlled by said relay for connecting said meter to said circuits selectively.

FREDERICK W. STEIN.

REFERENCES CITED

The following references are of record in the file of this patent:

UNITED STATES PATENTS

| Number | Name | Date |
|---|---|---|
| 2,043,241 | Eyer | June 9, 1936 |
| 2,440,386 | Stein | Apr. 27, 1948 |
| 2,542,928 | Kimball et al. | Feb. 20, 1951 |
| 2,560,209 | Borell et al | July 10, 1951 |
| 2,563,062 | Perley | Aug. 7, 1951 |
| 2,568,199 | Martinet | Sept. 18, 1951 |